United States Patent [19]
Blackwell

[11] 3,782,407
[45] Jan. 1, 1974

[54] TAP ARRANGEMENT USEFUL WITH MEASURING MEANS

[76] Inventor: William L. Blackwell, 1202 New Market Rd., Immokalee, Fla.

[22] Filed: June 26, 1972

[21] Appl. No.: 266,134

[52] U.S. Cl.................... 137/317, 73/212, 285/188, 285/DIG. 22
[51] Int. Cl............................................. F16k 51/00
[58] Field of Search..................... 285/188, DIG. 22; 73/182, 212, 420; 136/26; 137/317

[56] References Cited
UNITED STATES PATENTS
| | | | |
|---|---|---|---|
| 1,255,622 | 2/1918 | McFarland...................... | 137/317 X |
| 1,446,618 | 2/1923 | Darley .................................. | 73/212 |
| 3,482,445 | 12/1969 | DeLeo et al...................... | 73/212 X |

Primary Examiner—Henry T. Klinksiek
Attorney—Alfred E. Wilson

[57] ABSTRACT

An arrangement for tapping a tube having a liquid flowing therethrough comprising in combination an elongated chamber adapted to be disposed alongside the outer wall of a tube to be tapped, having an extended wall adapted to rest next to said outer tube wall and a plurality of apertures adjacent said extended wall, a tap bore duct extending from said chamber at right angles thereto including an outer retaining ring towards the outer end of said bore for securing the elongated chamber to said tube outer wall, and a small ridge within said bore, narrowing the flow stream into said chamber.

4 Claims, 5 Drawing Figures

TAP ARRANGEMENT USEFUL WITH MEASURING MEANS

BACKGROUND OF THE INVENTION

The present invention relates to a tap and more particularly to a tap arrangement which will permit a measurable and controlled flow of liquid from the tap.

BRIEF DESCRIPTION OF THE PRIOR ART

A considerable number of taps and pipe mountings have been invented such as are described in the Laich, U. S. Pat. No. 3,065,004; Meyers et al., U. S. Pat. No. 3,033,624; Franklin, U. S. Pat. No. 2,225,472; Schellin, U. S. Pat. No. 1,538,007 and Histed et al., U. S. Pat. No. 628,005. Not withstanding the foregoing list, taps which are to provide measurements are usually made by impact tubes and pitot tubes. The main reason for this is that in most cases, a tap must also be able to provide information regarding the character of the stream and to measure its discharge. In other words, it is extremely helpful if the tap can be useful in connection with a pressure gage, monometer recorders and controllers. Thus an impact tube usually has an elbow bent at right angles to the bore into the pipe so as to present an upstream facing aperture. A pitot tube is similar to an impact tube and is used in connection with a differential monometer, one leg being connected to a static opening, the other leg being an impact tube connected into the running stream. This will provide the velocity to the monometer. The difficulty with a pitot tube is that it provides no other useful function. Therefore, to summarize the present situation, certain taps described in the patents listed are known, but these provide no measurement information; also certain measuring arrangements are known, but these usually cannot be used except for measurement tapping.

The present invention relates to an arrangement which is useful both as a tap for general purposes and which can also be used for measurement purposes.

The invention as well as other objects and advantages thereof will become more apparent when considered with the accompanying drawings, in which.

As hereinbefore explained, a tap or a number of taps have only limited use if flow measurements cannot be made. Furthermore, two taps are better than one if these are obtainable.

Figure 1:
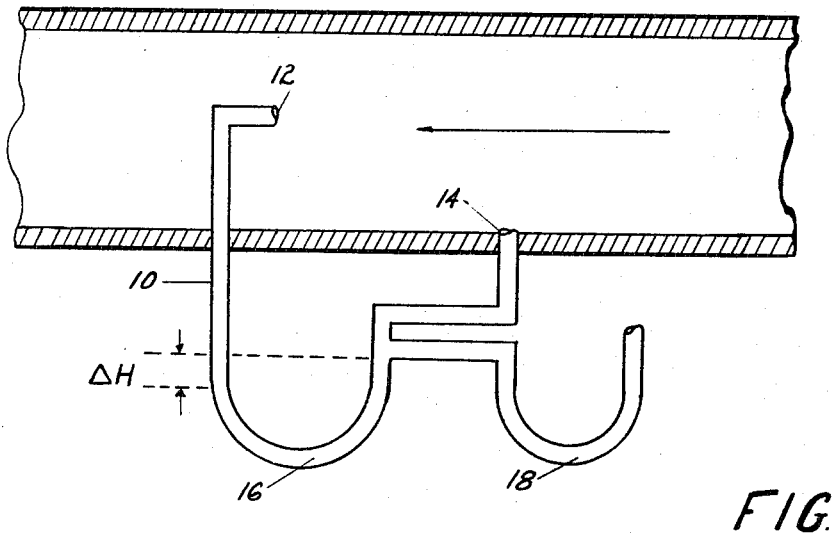
FIG. 1 illustrates a prior art pitot tube arrangement as described in Chemical Engineers' Handbook.

If the legs of a differential manometer are connected, one to a static opening and the other to an impact opening, the reading evidently measures the velocity head directly. A pitot tube that is used in such a manner is shown in FIG. 1. When the reading $\Delta H$ is expressed in feet of the fluid flowing and the static opening is so located that it truly records the static pressure of the fluid at the tip of the impact tube, the velocity at that point is $V_o = \sqrt{2g\Delta H} = 2_{gc}(p_i-p_o)/p_o$, Perry "Chemical Engineers' Handbook," 3rd Edition, 1950, page 398. This reference book then goes on to state: "that practically the only cause of a deviation in practice from the theoretical formula given above is an improper static opening." In a pipe or duct, if the point of measurement is preceded by at least 50 diameters of straight pipe, the greatest precision is obtained by the use of properly made sidewall static holes at the cross section where the impact tip is located. The impact tube, preferably streamlined, should be very small compared with the cross section of the duct, to minimize interference with the normal flow. Under such conditions, the theoretical formula is experimentally accurate, and the apparatus requires no calibration.

"A large number of very convenient compact pitot tubes have been developed and are available commerically. . ." the static openings are small holes drilled in the outer wall of the double pipe. The inner passage forms the impact tube proper. If the static openings are carefully made and are located 6 tube diameters from the point where the tube wall becomes parallel to the stream when the apparatus is correctly placed and at least 10 diameters from the support rod, the readings will agree closely with the theoretical equation. In general, however, it is advisable to take the formula for a commercial compact-type tube to be $V = C \sqrt{2g \Delta H}$ and to determine the coefficient C by calibration. The value for C for commerical pitot tubes is generally between 0.8 and 1.0, but, for a given tube, C may vary with the velocity, viscosity, and density of the fluid under investigation. The compact type instrument is used almost wholly in practical engineering work on account of its convenience. When accuracy is desired, all pitot tubes should be preceded by as great a length of straight channel as possible. With compact pitot tubes, great care should be exercised to have the impact opening facing exactly upstream, for in the case of many such instruments, a slight inclination of the tip will bring the static openings into an improper position and thus cause a serious error in the results. It is most important to realize that the orientation for the maximum reading does not necessarily correspond with that for the correct reading; for one of the best compact pitot tubes the maximum reading is 15 per cent greater that the true reading and occurs when the tube is 30° out of alignment. . .

"The modified pitot tube known as a pitometer has one pressure opening facing upstream and the other facing downstream. The differential between the two openings is usually from 25 to 50 per cent more than that for a standard pitot tube, so that the instrument is of advantage in dealing with low velocities. There are commercially available very compact types of pitometers which require relatively small openings for their insertion into a duct. It is important that these instruments be calibrated under substantially the conditions of use."

From the foregoing quotation, it is readily apparent that it is necessary to measure a liquid both dynamically and statically in order to have meaningful information. As hereinbefore explained, FIG. 1 shows a pitot tube 10 with a dynamic mouth 12 and a static opening 14 providing differential flow across a measurement elbow and an output elbow 18. The differential pressure H is shown in the drawing. As hereinbefore explained, this type of instrument will require great accuracy in positioning. It is doubtful that it could be used with any of the taps of the prior art patents hereinbefore enumerated.

Figure 2:
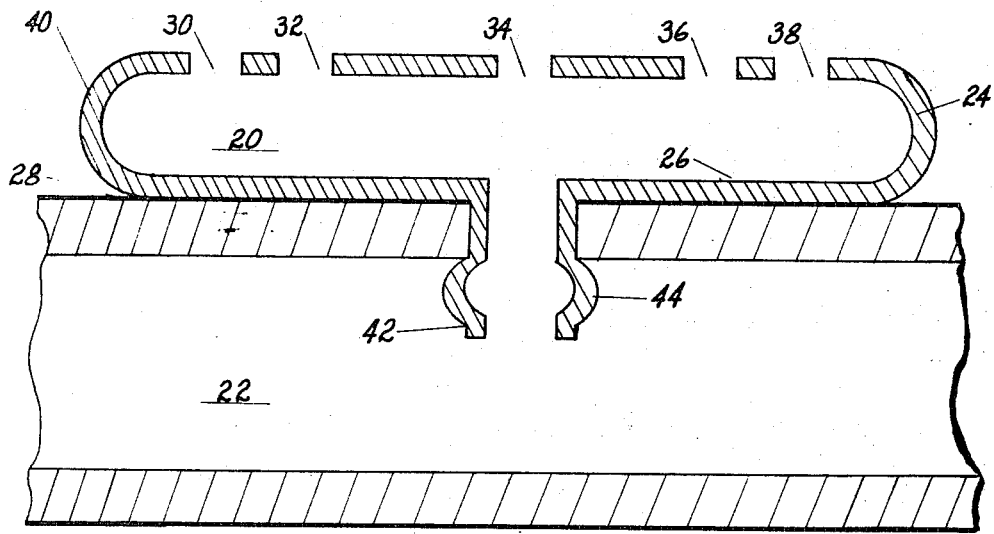
FIG. 2 shows a longitudinal sectional view of the inventive concept.

Considering now the arrangement depicted in FIG. 2 showing a tap 20 for a pipe 22. Tap 20 comprises an elongated chamber 24 with a wall 26 which will engage the outer wall 28 of tube 22. If as shown in FIG. 2, the chamber 24 is substantially cylindrical, the outer wall 28 of the tube, and the openings 30, 32, 34, 36 and 38 in wall 26 with closed end walls 40 preferably opposite to the position of contact with the outer tube wall 28.

Figure 3:
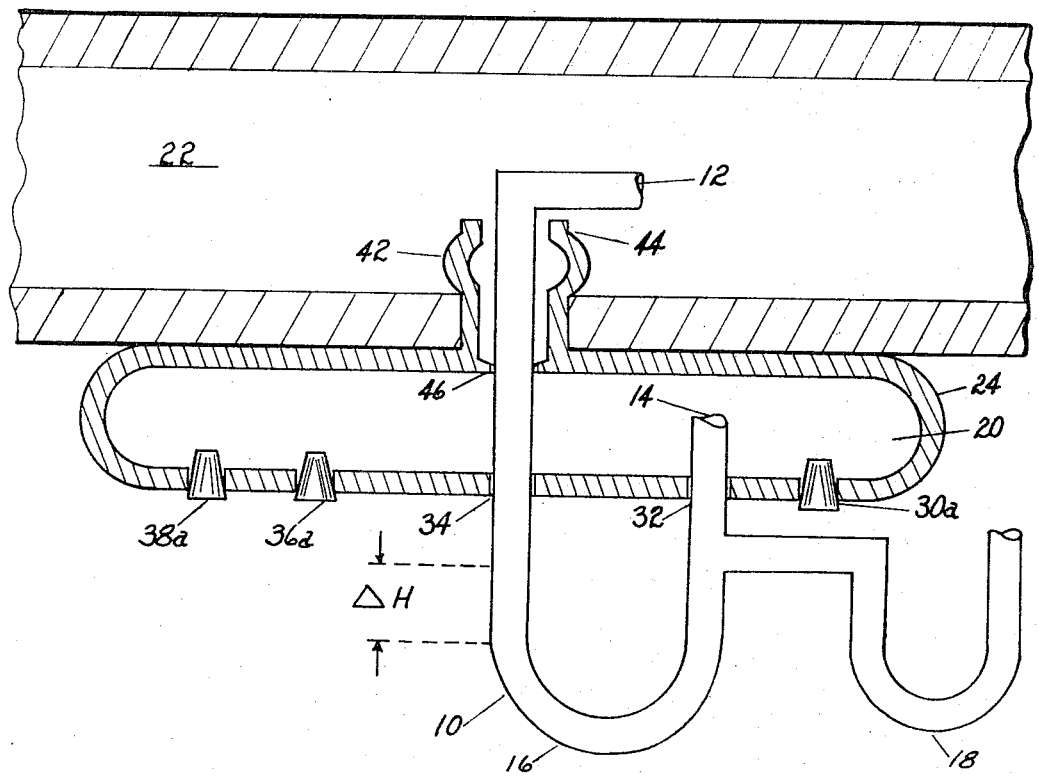
FIG. 3 illustrates a view of the inventive concept used in connection with a pitot tube arrangement.

Piercing through outer tube wall 28 is a tap bore duct 42. Tap duct 42 has a retainer ring 44 which is nothing more that a boss around the pipe. Thus, when the tap 44 is inserted into pipe 22, it is possible to then obtain liquid from one or several of the openings 30 to 38. The additional advantage of the construction herein illustrated is its use with a pitot tube as shown in FIG. 3. Here the dynamic mouth 12 is within the tube as shown in FIG. 1. However, the static opening 14 is in chamber 20. The pitot tube is so sized that it will fit through the tap with fair tolerance and liquid can flow into the chamber. In effect, there is a static situation in chamber 20 and a dynamic situation in tube 22. Thus static opening 14 in chamber 20 need not be placed with great precision since the situation in the chamber is fairly well regulated by the ridges 46. In this way a more meaningful output is obtainable from the pitot tube for a manometer (not show). Apertures 30, 36 and 38, not used, can be stopped by stoppers 30a, 36a and 38a.

Figure 4:
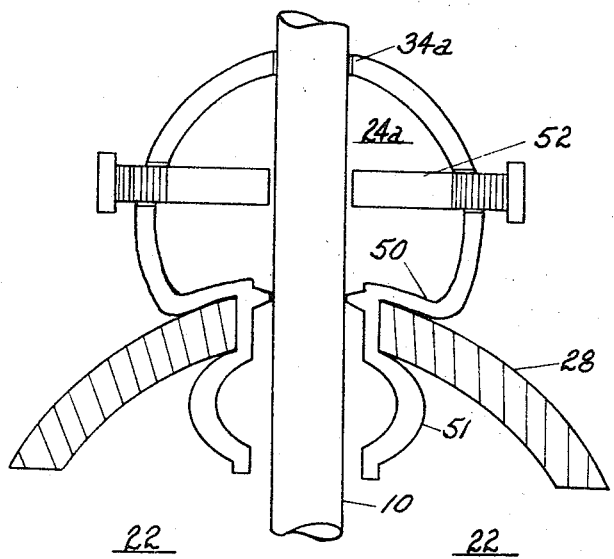
FIG. 4 shows a sectional view of another possible configuration of the tap illustrated in FIG. 2; and, FIG. 5 depicts a cross sectional view of a working drawing of the invention.

A slightly modified version of the inventive concept is shown in FIG. 4. Here the chamber 24a which has an opening 34a is not a cylinder but has a concave portion 50 which will engage the outer wall 28 of the tube 22. The concave portion 50 does not have to have a curvature precisely that of the tube wall. The curvature of course should not be smaller but can be greater. This enhances the contact between the tube wall and the tap arrangement, and the concave portion 50 cooperates with a convex flange 51 to seal the inside wall of the tap to the tube.

It is also possible either with the embodiment of FIG. 2 or that shown in FIG. 4 to secure the pitot tube 10 in the flow tube using screws 52 passing into chamber 24a. This thus insures that the pitot tube will maintain a proper orientation so as to derive best results.

Figure 5:
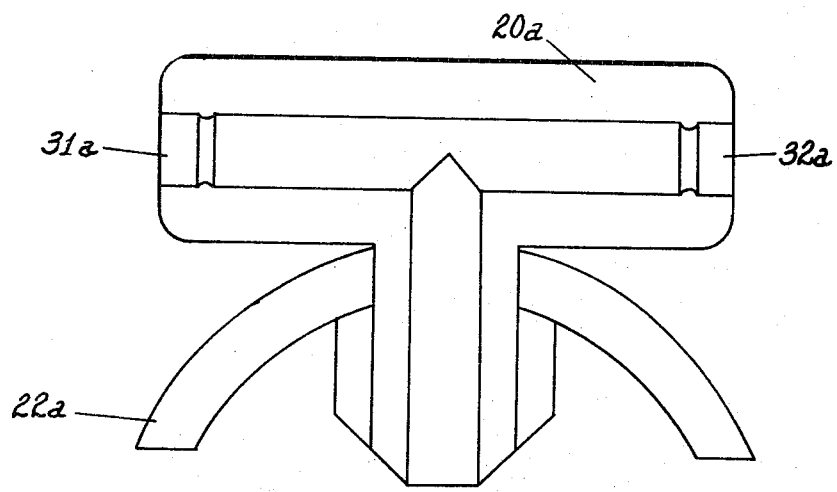

A practical embodiment of the invention is illustrated in FIG. 5 showing a working drawing of a tube 22a with a tap 20a and openings 31a, 32a which are offset 90° from those shown in FIG. 3.

I claim:

1. An arrangement for tapping a tube having a liquid flowing therethrough comprising in combination:
   a. an elongated chamber (24) adapted to be disposed alongside the outer wall (28) of a tube to be tapped, having an extended wall (26) adapted to rest next to said outer wall (28) and a plurality of apertures in said chamber; and,
   b. a tap bore duct (42) extending from said chamber at right angles thereto including an inner retaining ring (44) towards the outer end of said bore for securing the elongated chamber to said tube wall.

2. An arrangement as claimed in claim 1 wherein said chamber (24a) has an extended concave wall to better engage the outer tube wall.

3. An arrangement as claimed in claim 1 wherein said chamber (24) has screws (52) piercing said chamber wall to hold a pitot tube.

4. An arrangement as claimed in claim 2 wherein said chamber (24a) has screws (52) piercing said chamber wall to hold a pitot tube.

* * * * *